United States Patent [19]
Anker

[11] Patent Number: 5,696,350
[45] Date of Patent: Dec. 9, 1997

[54] INTERCHANGEABLE SECTIONAL WALLPLATES

[75] Inventor: Herbert Anker, Little Neck, N.Y.

[73] Assignee: Leviton Manufacturing Co., Inc., Little Neck, N.Y.

[21] Appl. No.: 374,003

[22] Filed: Jan. 18, 1995

[51] Int. Cl.[6] .................................................. H05K 5/03
[52] U.S. Cl. ............................ 174/66; 220/241; 220/3.4
[58] Field of Search ............................... 174/66, 49, 55; 439/557, 533, 536; 220/3.8, 3.7

[56] References Cited

U.S. PATENT DOCUMENTS

| | | | |
|---|---|---|---|
| 19,092 | 2/1858 | Despard | 247/20 |
| 1,717,871 | 6/1929 | Both | 220/241 |
| 4,717,358 | 1/1988 | Chaundy | 439/557 |
| 4,725,249 | 2/1988 | Blackwood et al. | 439/535 |
| 4,756,695 | 7/1988 | Lane et al. | 439/76 |
| 4,875,880 | 10/1989 | Welch et al. | 439/530 |
| 4,972,045 | 11/1990 | Primeau | 174/66 |
| 5,045,640 | 9/1991 | Riceman | 174/67 |
| 5,189,259 | 2/1993 | Carson et al. | 174/66 |

FOREIGN PATENT DOCUMENTS

| | | | |
|---|---|---|---|
| 1317414 | 5/1973 | United Kingdom | H05K 7/18 |
| 1492961 | 11/1977 | United Kingdom | H02G 3/00 |

*Primary Examiner*—Hyung S. Sough
*Assistant Examiner*—Joseph Waks
*Attorney, Agent, or Firm*—Paul J. Sutton

[57] ABSTRACT

An interchangeable wallplate assembly made up of two or more interchangeable panels which can be locked together to cover electrical devices mounted in two or more ganged gem boxes. The panels can be blank or have apertures to permit portions of the electrical devices to extend therethrough for front access. If an electrical device is changed or another is added or removed the assembly can be altered to match the new electrical device configuration. End panels each have a pawl and a loop spaced along one wall while central panels have pawls and loops spaced along both walls. Thus, end panels can be joined to themselves or to a central panel which can also be mounted to similar central panels to allow the assembly to be increased to cover any ganged gem box.

6 Claims, 5 Drawing Sheets

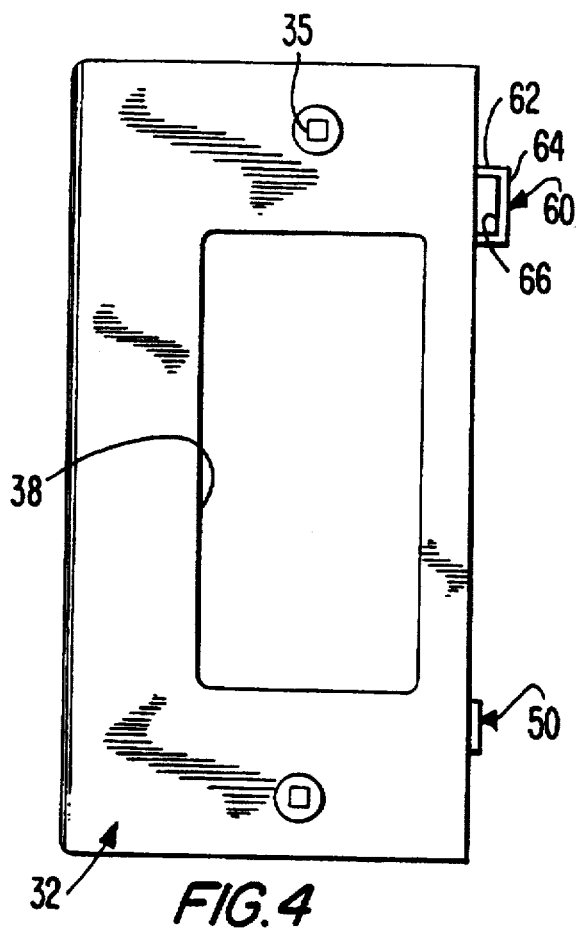
FIG.4
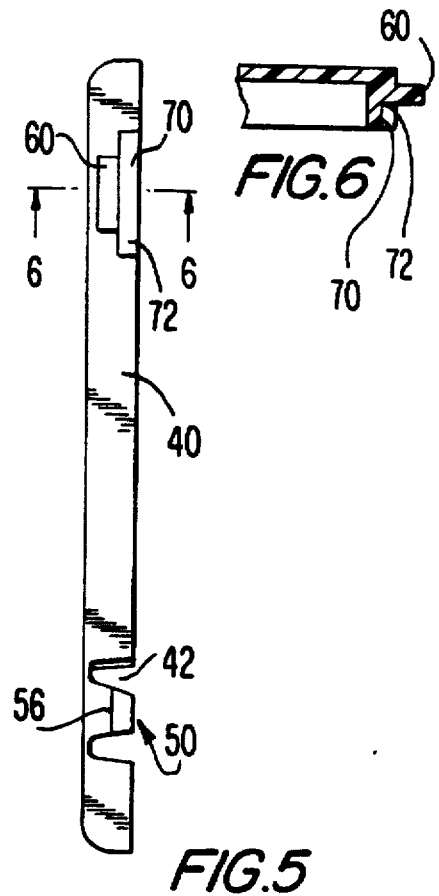
FIG.6
FIG.5
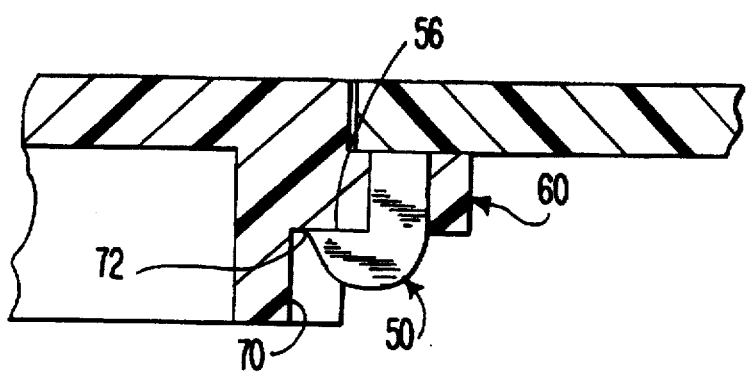
FIG.7

5,696,350

1

INTERCHANGEABLE SECTIONAL WALLPLATES

BACKGROUND OF THE INVENTION

1. Field of the Invention

The invention is directed to wall plates to cover electrical devices mounted in ganged gem boxes and more particularly to a wallplate made up of a plurality of sections which can be combined to match the electrical devices mounted in such ganged gem boxes.

2. Description of the Prior Art

At present, wall plates to cover electrical devices mounted in gem boxes are made in sizes to match the number of gem boxes in use from a single box to three or four ganged gem boxes. In addition, the wallplates must have apertures therethrough so that front access is possible to each type of electrical device in use. At present the apertures include an aperture for a rocker-type switch, an aperture for a toggle-type switch, for a round single receptacle, and for a duplex receptacle as well as a blank. There are also composite wallplates, for example, where there is one toggle-type switch aperture and one-half of a duplex receptacle aperture. To stock all possible combinations of electrical device apertures for all possible locations for a variable number of ganged gem boxes is very difficult and expensive and requires a large inventory of wallplates to be available at all times. Any change in the electrical devices in the ganged gem boxes requires a new wallplate.

SUMMARY OF THE INVENTION

The present invention overcomes the difficulties set out above with respect to prior art wallplates. The invention employs end panels and central panels which can be interchanged, as desired, to create a wall panel assembly for each configuration of electrical devices in any number of ganged gem boxes. The end panels have a smooth, curved top, bottom and one side wall. The other side wall is perpendicular to the panel body and contains spaced apart locking hook and clasp. The central panel has smooth curved top and bottom walls and side walls perpendicular to the panel body. Each of these side walls contains spaced apart locking hook and clasp. End panels can be locked to each other or to a central panel by engaging the clasp on one side with a locking hook on an associated end or central panel side and the locking hook on the same side with the clasp of the associated end or central panel. In the case of a central panel, additional central panels can be joined in a chain arrangement and each exposed side wall terminated with an end panel. By providing end panels and central panels with the desired apertures, the panels can be combined to match the electrical devices to be covered. The wallplate assembly can thereafter be changed to match any change in the electrical devices or ganged gem boxes. It is an object of this invention to provide a novel wallplate assembly made up of at least two interchangeable panels.

It is another object of this invention to provide a novel wallplate assembly made up of at least two interchangeable panels which can be altered as desired.

It is another object of the invention to provide a novel wallplate assembly whose individual panels can be locked together using a novel hook and clasp locking system.

It is still another object of the invention to provide a novel wallplate assembly whose individual panels can be selectively locked or unlocked from each other using a novel hook and clasp locking system.

2

It is yet another object of this invention to provide a novel wallplate assembly employing interchangeable panels having apertures therethrough for access to electrical devices behind said wallplate assembly.

Other objects and features of the invention will be pointed out in the following description and claims and illustrated in the accompanying drawings, which disclose, by way of example, the principles of the invention and the best mode which is presently contemplated for carrying them out.

BRIEF DESCRIPTION OF THE DRAWING

In the drawing in which similar elements are given similar reference characters:

FIG. 4 is a top plan view of the end panel of FIG. 1.

FIG. 5 is a side elevational view of the end panel of FIG. 4.

FIG. 6 is a fragmentary portion of the end panel of FIG. 5, partially in section taken along the line 6—6 in FIG. 5.

FIG. 7 is a fragmentary portion of a side elevation the two end panels of FIG. 3 locked to one another and shown partially in section.

DESCRIPTION OF THE PREFERRED EMBODIMENTS

Figure 1:
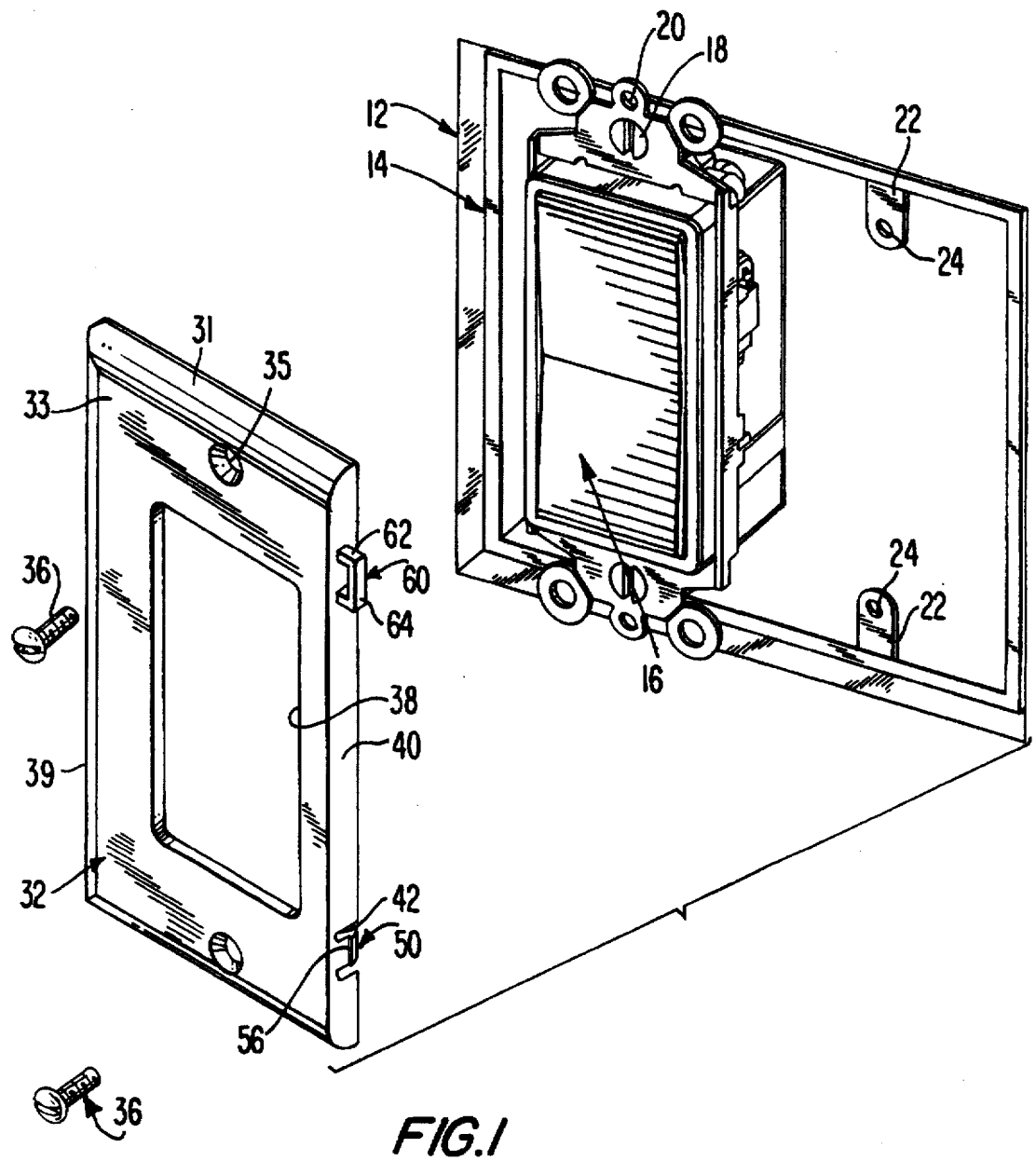
FIG. 1 is, an exploded perspective view of a rocker-type switch mounted in a double ganged gem box with the method of mounting thereover an end panel constructed in accordance with the concepts of the invention.
Figure 2:
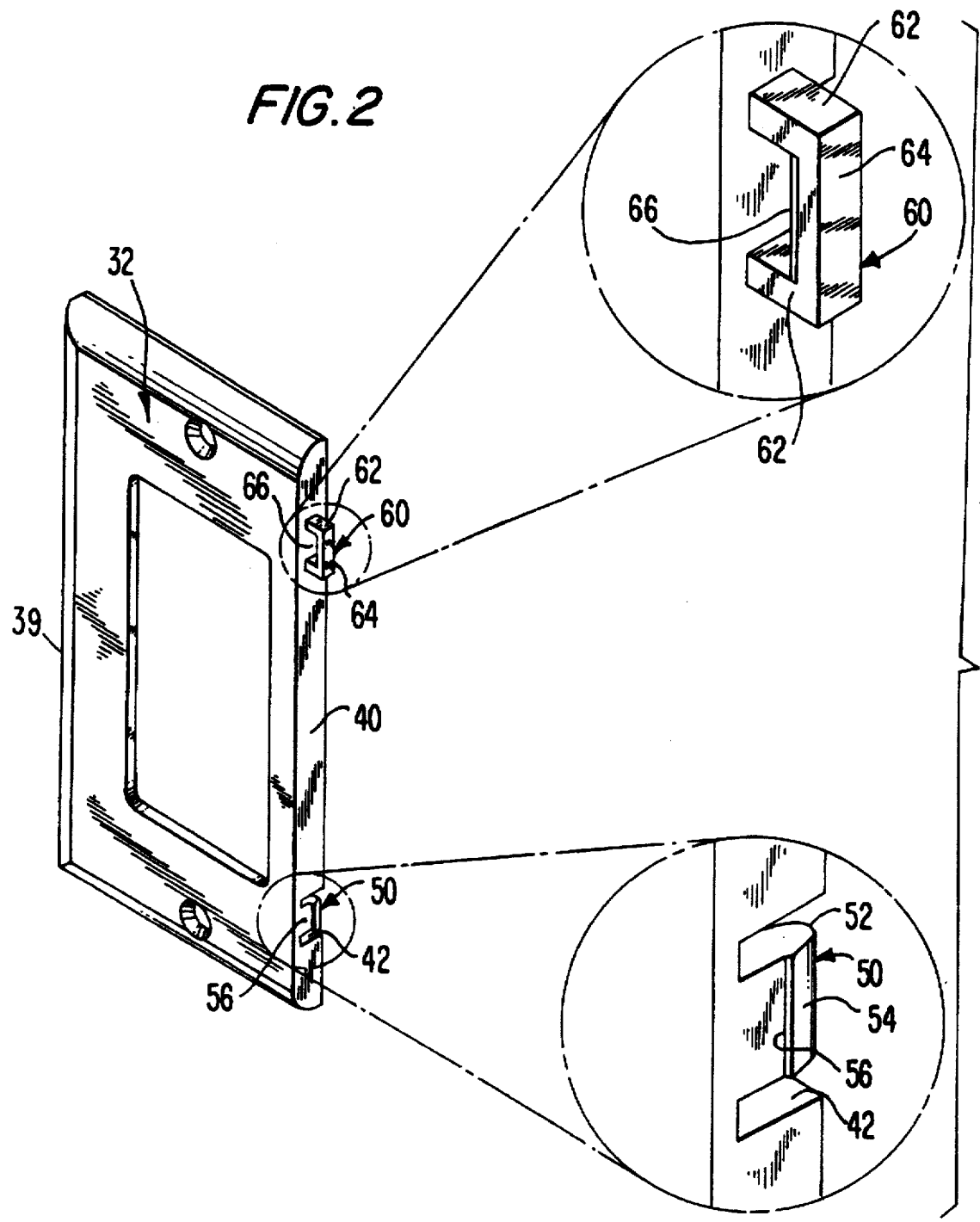
FIG. 2 is a perspective view of the end panel of FIG. 1 with enlargements of the clasp and hook of such end panel.

Turning now to FIGS. 1 to 10 an interchangeable sectional wallplate assembly 30 is shown. FIG. 1 shows an end panel 32 which may be locked to an inverted end panel 34 (see FIG. 3) to form a wallplate assembly to cover the double ganged gem box 14 of FIG. 1. In FIG. 1 the wall 12 has been cut and a double ganged gem box 14 has been installed to the wall 12 or to studs behind wall 12 (not shown) employing fasteners (not shown). A rocker-type switch 16 is installed to the depending ears (not shown) using mounting screws 18. The switch 16 has threaded apertures 20 which receive mounting screws 36 which pass through apertures 35 in panel 32 to anchor end panel 32 to the switch 16. Panel 32 has a cut-out or aperture 38 to permit the toggle portion of switch 16 to extend beyond the front face 33 of panel 32 so that it can be easily accessed. Panel 32 has a top wall 31, a bottom wall 37 and an outside wall 39 which all meet from face 33 at rounded edges. A second inside wall 40 extends perpendicular to panel 32 and meets front face 33 at right angles.

A second electrical device can be placed in box 14 and attached to the mounting ears 22 by means of mounting screws 18 engaging the threaded apertures 24 in the ears 22.

Figure 9:
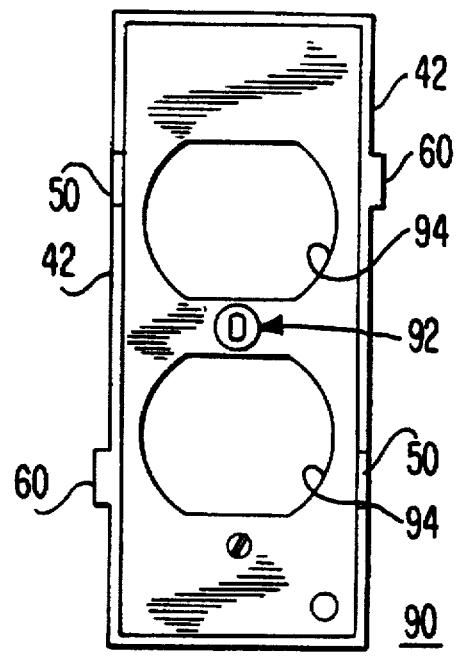
FIG. 9 is a top plan view of a central panel, according to the present invention having apertures for a duplex receptacle.
Figure 10:
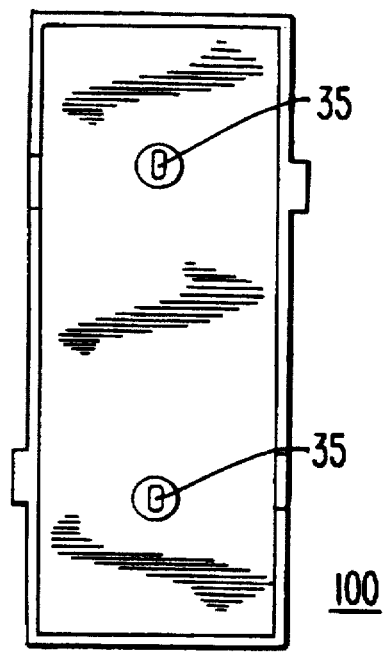
FIG. 10 is a top plan view of a central panel, according to the present invention, without any aperture, commonly referred to as blank.

If such second device is also a rocker-type switch, the second end panel 34 (see FIG. 3) will have a cut-out or aperture 38 the same as end panel 32. Panel 34 will also have a top wall 31, a bottom wall 37 and an outside side wall 39 with rounded corners and a generally flat inside side wall 40 meeting the front face 33 at a right angle. However, end panel 34 need not have the same type of aperture as end panel 32. The panel could be blank as shown by panel 100 in FIG. 10, wherein only mounting screw apertures 35 are present. The end panel could also have an aperture 84 to receive a toggle-type switch as shown by panel 80 in FIG. 8. Panel 80 also contains mounting apertures 35. Panel 90 in FIG. 9 shows the dual apertures 94 to receive the two portions of a duplex receptacle, and a single central aperture 92 to receive a mounting screw.

Returning to FIGS. 1 and 2 the locking devices used to hold in assembly two or more interchangeable panels are shown. A locking hook 50 is formed in side wall 40 by two slots 42. The free end 52 of hook 50 is rounded and formed with an outwardly tapered surface 54 which terminates in a locking ridge 56 generally parallel with panel 32 front face 33. A locking clasp 60 is formed in the same side wall 40 and extends generally perpendicular to side wall 40 and spaced along said wall a distance from hook 50. The clasp 60 has two parallel spaced apart legs 62 which extend perpendicularly from side wall 40. The legs 62 fit snugly in the two slots 42 that delineate the hook 50. Joining the two legs 62 at their free ends is cross member 64 which with legs 62 and side wall 40 define a closed slot 66. The width of slot 66 between side wall 40 and the inside surface of cross member 44 is smaller than the thickness of hook 50 at its outwardly tapered surface 54 so that the hook 50 cannot fully enter slot 66 without additional force being exerted.

Turning now to FIGS. 5, 6 and 7 the locking system for the interchangeable sectional wall plate assembly is described. Below the clasp 60, in side wall 40 is formed a recess 70 which has an upper wall 72 formed in line with the underside of clasp 60. Upper wall 72 acts as a stop surface which is engaged by locking ridge 56 of hook 50.

As stated above the hook 50 enters the slot 66 to a limited degree. By pushing down on panel 32 while pushing up on panel 34 adjacent the mated hook 50 and clasp 60, the width of the slot 66 is increased so that the entire thickness of the hook 50 at outwardly tapered surface 54 passes thorugh slot 66. This continues until legs 62 bottom out in slots 42 and the thinner portion of hook 50 is in slot 66 permitting locking ridge 56 of hook 50 to engage upper wall 72 of recess 70 locking the panels 32 and 34 together.

Figure 3:
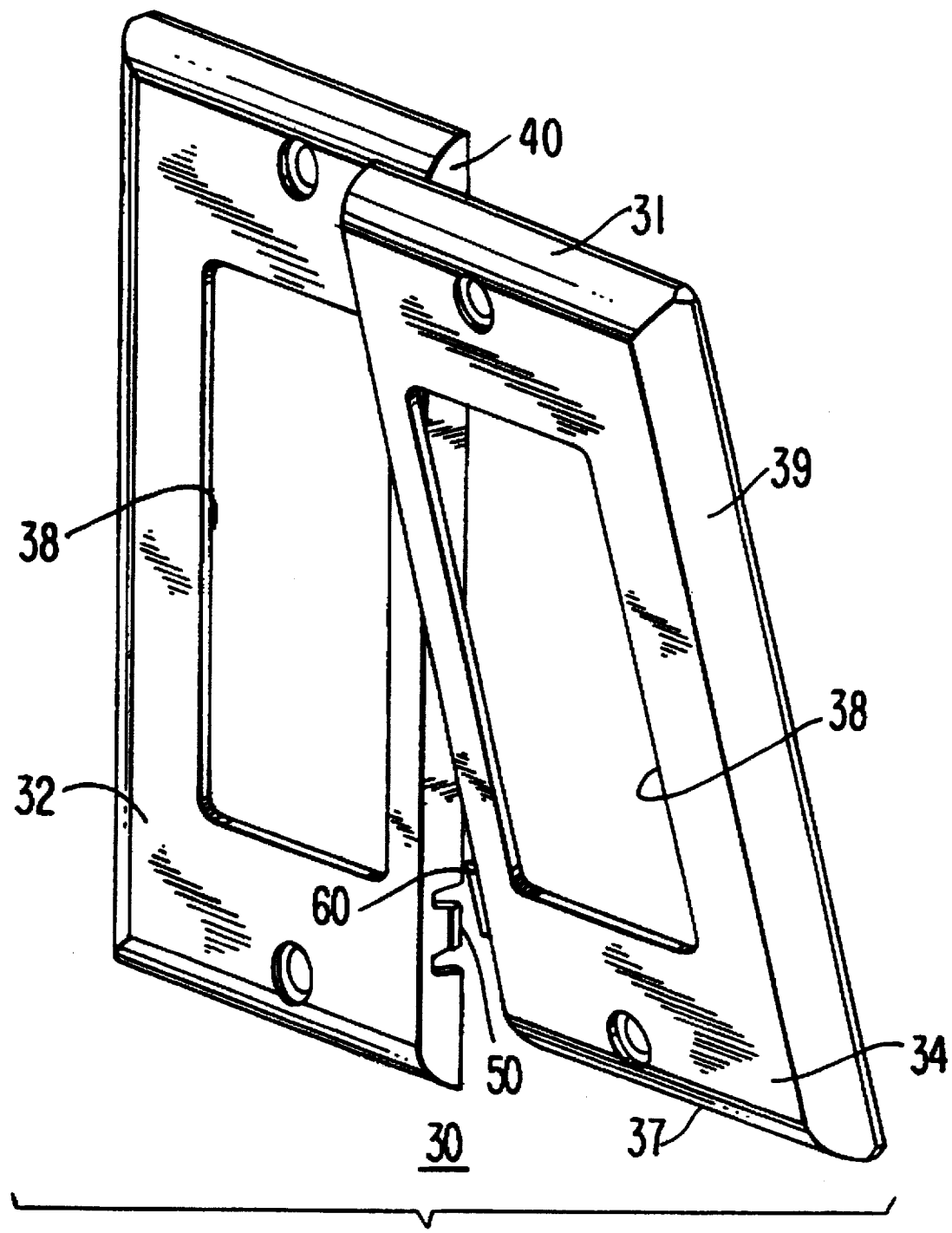
FIG. 3 is a perspective view of two end panels constructed in accordance with the concepts of the invention in a position prior to engagement of the locking hooks and clasps.
Figure 8:
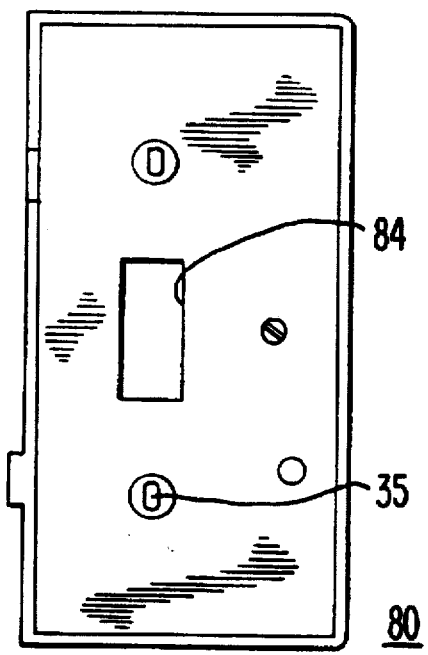
FIG. 8 is a top plan view of an end panel, according to the present invention, having a toggle-type switch aperture.

To engage both sets of locking members of the panels 32 and 34 the method illustrated in FIG. 3 is employed. Panels 32 and 34 are set with side walls 40 facing each other and panels 32 and 34 are positioned as an X. Panels 32 and 34 are rotated, panel 34 clockwise and panel 32 counter clockwise, with side walls 40 in contact until each of the hooks 50 enter a corresponding loop 66. Then the top end of panel 34, adjacent the hook 50 and clasp 60, is pushed downwardly towards panel 32 while the bottom end of panel 32, adjacent the hook 50 and clasp 60, is pushed downwardly towards panel 34 until the locking ridge 56 of hooks 50 engage the upper wall 72 of the recesses 70. The panels 32 and 34 may be released and separated by rotating the panels 32 and 34 in opposite directions.

Where the number of ganged gem boxes employed are three or more, then one or more central panels can be inserted between the end panels just described. Panel 90 as shown in FIG. 9 has two perpendicular side walls 42 each meet the front face of panel 90 at right angles and each of which has a hook 50 and a clasp 60. The central panel 90 has a top wall 96 and a bottom wall 98 which meet the front face of panel 90 with rounded corner. The central panel 90 can have an end panel 32, 34 installed at each side wall 42 or may be attached to other central panels with the wallplates completed by adding end panels at each end of the assembled central panels.

While there have been shown and described and pointed out the fundamental novel features of the invention as applied to the preferred embodiments, it will be understood that various omissions and substitutions and changes of the form and details of the devices illustrated and in their operation may be made by those skilled in the art, without departing from the spirit of the invention.

The embodiments of the invention in which an exclusive property or privilege is claimed are defined as follows:

1. A wallplate assembly having first and second interchangeable sections, each section comprising:
   a. a panel having two mounting apertures therethrough from a front face to a rear face to permit said panel to be mounted to an electrical device;
   b. said panel having a top portion, a bottom portion and a first side wall, said top portion, said bottom portion and said first side wall each meeting said panel front face at a rounded edge;
   c. said panel having a second side wall, said second side wall having a free end and extending at a right angle to said front face of said panel;
   d. clasp means on said second side wall; and
   e. hook means on said second side wall spaced from said clasp means, said hook means on said first interchangeable section to hold said first and second sections together said hook means is formed by two slots and has a rounded surface thereon terminating in a locking ridge.

2. A wallplate assembly having first and second interchangeable sections, each section comprising:
   a. a panel having two mounting apertures therethrough from a front face to a rear face to permit said panel to be mounted to an electrical device;
   b. said panel having a top portion, a bottom portion and a first side wall, said top portion, said bottom portion and said first side wall each meeting said panel front face at a rounded edge;
   c. said panel having a second side wall, said second side wall having a free end and extending at a right angle to said front face of said panel;
   d. clasp means on said second side wall, said clasp means is U-shaped and extends outwardly from said second side wall to provide an enclosed slot;
   e. hook means on said second side wall spaced from said clasp means, said hook means on said first interchangeable section to hold said first and second interchangeable sections together, said hook means is formed by two slots and has a rounded surface thereon terminating in a locking ridge, and
   f. said rounded surface of said hook means expanding said slot until said locking ridge of said hook means engages said clasp means.

3. A wallplate assembly having first and second interchangeable sections, each section comprising:
   a. a panel having two mounting apertures therethrough from a front face to a rear face to permit said panel to be mounted to an electrical device;

b. said panel having a top portion, a bottom portion and a first side wall, said top portion, said bottom portion and said first side wall each meeting said panel front face at a rounded edge;

c. said panel having a second side wall, said second side wall having a free end and extending at a right angle to said front face of said panel;

d. clasp means on said second side wall, said clasp means is U-shaped and extends outwardly from said second side wall to provide an enclosed slot;

e. a recess in said second side wall adjacent said clasp means and the free end of said second side wall, said recess providing a locking surface adjacent said clasp means; and f. hook means on said second side wall spaced from said clasp means, said hook means on said first interchangeable section to hold said first and second interchangeable sections together, said hook means is formed by two slots and has a free end adjacent the free end of said second wall, said hook means having a rounded surface thereon terminating in a locking ridge; and g. said rounded surface of said hook means expanding said slot until said locking ridge of said hook means engages said clasp means.

4. A wallplate assembly having first and second interchangeable sections, each section comprising:

a. a panel having two mounting apertures therethrough from a front face to a rear face to permit said panel to be mounted to an electrical device;

b. said panel having a top portion, a bottom portion and a first side wall, said top portion, said bottom portion and said first side wall each meeting said panel front face at a rounded edge;

c. said panel having a second side wall, said second side wall having a free end and extending at a right angle to said front face of said panel;

d. clasp means on said second side wall, said clasp means is U-shaped and extends outwardly from said second side wall to provide an enclosed slot;

e. a recess in said second side wall adjacent said clasp means and the free end of said second side wall, said recess providing a locking surface adjacent said clasp means; and f. hook means on said second side wall spaced from said clasp means, said hook means on said first interchangeable section to hold said first and second interchangeable sections together; said hook means on said second interchangeable section is arranged to engage said clasp means on said first interchangeable section whereby the front faces of said two interchangeable sections are coextensive;

g. said hook means is formed by two slots and has a free end adjacent the free end of said second side wall, said hook means having a rounded surface thereon terminating in a locking ridge; and h. said rounded surface of said hook means expanding said slot until said locking ridge of said hook means engages said locking surface adjacent said clasp means.

5. A wallplate assembly having two end sections and at least one central section and first and second interchangeable sections, each of said two end sections comprising:

a. a panel having two mounting apertures therethrough from a front face to a rear face to permit said panel to be mounted to an electrical device;

b. said panel having a top portion, a bottom portion and a first side wall, said top portion, said bottom portion and said first side wall each meeting said panel front face at a rounded edge;

c. said panel having a second side wall, said second side wall extending at a right angle to said front face of said panel:

d. clasp means on said second side wall;

e. hook means on said second side wall spaced from said clasp means, said hook means on a first of said interchangeable sections is arranged to engage said clasp means on a second of said interchangeable sections to hold said first and second interchangeable sections together;

f. said at least one central section having a further panel portion having two further mounting apertures therethrough from a further front face to a further rear face to permit said further panel portion to be mounted to an electrical device;

g. said further panel portion having a further top portion, a further bottom portion and further first and second side walls, said further top portion and said further bottom portion each meeting said further panel front face at a rounded edge, said further first and second side walls extending at a right angle to said front face of said further panel portion;

h. further clasp means, one on each of said further first and second side walls;

i. further hook means, one on each of said further first and second side walls spaced from said further clasp means on the same one of said further first and second side walls, said further hook means on a central section side wall is arranged to engage said clasp means on one of said end sections to hold said central section and said one of said end sections together;

j. said clasp means and said further clasp means are U-shaped and extend outwardly from said second side wall and said further side walls, respectively, to provide enclosed slots;

k. said hook means and said further hook means are each tongues formed by two slots and having a camming surface thereon terminating in locking surfaces; and l. said camming surfaces of said hook means and said further hook means expanding said slot until said locking surfaces of said hook means engage said clasp means and further second side wall and said further first and second side walls, respectively, to provide enclosed slots.

6. A wallplate assembly having two end sections and at least one central section and first and second interchangeable sections, each of said two end sections comprising:

a. a panel having two mounting apertures therethrough from a front face to a rear face to permit said panel to be mounted to an electrical device;

b. said panel having a top portion, a bottom portion and a first side wall, said top portion, said bottom portion and said first side wall each meeting said panel front face at a rounded edge;

c. said panel having a second side wall, said second side wall extending at a right angle to said front face of said panel;

d. clasp means on said second side wall;

e. hook means on said second side wall spaced from said clasp means, said hook means on a first of said interchangeable sections is arranged to engage said clasp means on a second of said interchangeable sections to hold said first and second interchangeable sections together;

f. said at least one central section having a further panel portion having two further mounting apertures therethrough from a further front face to a further rear face to permit said further panel portion to be mounted to an electrical device;

g. said further panel portion having a further top portion, a further bottom portion and further first and second side walls, said further top portion and said further bottom portion each meeting said further panel front face at a rounded edge, said further first and second side walls extending at a right angle to said front face of said further panel portion;

h. further clasp means, one on each of said further first and second side walls;

i. further hook means, one on each of said further first and second side walls spaced from said further clasp means on the same one of said further first and second side walls, said further hook means on a central section side wall is arranged to engage said clasp means on one of said end sections to hold said central section and said one of said end sections together;

j. said clasp means and said further clasp means are U-shaped and extend outwardly from said side wall and said further first and second side walls, respectively, to provide enclosed slots;

k. a recess in each of said side walls and said further first and second side walls adjacent its associated clasp means and further clasp means, said recesses providing a locking surface adjacent said clasp means and said further clasp means;

l. said hook means and said further hook means each comprising a tongue formed by two slots and having a free end adjacent the free end of said second side walls and said further first and second side walls, said tongues each having a camming surface thereon terminating in a locking surface; and m. said camming surface of said hook means and said further hook means expanding its associated slot until said locking surface of said hook means and said further hook means engages said locking surface of said hook means and said further hook means engage said locking surface adjacent said clasp means and said further clasp means.

* * * * *